United States Patent
Patel et al.

(10) Patent No.: US 10,873,983 B1
(45) Date of Patent: Dec. 22, 2020

(54) METHOD AND DEVICE FOR SELECTING A NETWORK MODE FOR AN INTERNET OF THINGS DEVICE

(71) Applicant: Verizon Patent and Licensing Inc., Arlington, VA (US)

(72) Inventors: Sudhir Patel, Boonton, NJ (US); Jeremy Nacer, Denville, NJ (US); Sachin Kamat, East Brunswick, NJ (US); David G. Greiner, New Hyde Park, NY (US); Nanjun Qian, Princeton, NJ (US); Ye Huang, San Ramon, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/511,636

(22) Filed: Jul. 15, 2019

(51) Int. Cl.
| | |
|---|---|
| *H04W 4/00* | (2018.01) |
| *H04W 76/14* | (2018.01) |
| *H04W 8/00* | (2009.01) |
| *H04W 4/70* | (2018.01) |
| *H04W 4/80* | (2018.01) |
| *H04W 52/02* | (2009.01) |

(52) U.S. Cl.
CPC ............ *H04W 76/14* (2018.02); *H04W 4/70* (2018.02); *H04W 4/80* (2018.02); *H04W 8/005* (2013.01); *H04W 52/0241* (2013.01)

(58) Field of Classification Search
None
See application file for complete search history.

(56) References Cited

U.S. PATENT DOCUMENTS

| | | | |
|---|---|---|---|
| 2016/0036819 A1* | 2/2016 | Zehavi ................... | H04W 4/70 726/4 |
| 2017/0332049 A1* | 11/2017 | Zhang ..................... | H04W 4/80 |
| 2018/0191577 A1* | 7/2018 | Herczog ................ | H04W 4/70 |

* cited by examiner

*Primary Examiner* — Clemence S Han

(57) ABSTRACT

An Internet of Things (IoT) device may receive a network configuration profile including one or more parameters relating to a scan interval and a mode priority of the IoT device indicating a priority for a first IoT network over a second IoT network. The IoT device may scan for an availability of the first IoT network. Based on determining that the first IoT network is unavailable, the IoT device may scan for an availability of the second IoT network. Based on determining that the second IoT network is available, the IoT device may initiate a network connection with the second IoT network. While connected to the second IoT network, the IoT device may scan for the availability of the first IoT network. Based on determining that the first IoT network is available, the IoT device may initiate a network connection with the first IoT network.

20 Claims, 8 Drawing Sheets

100 ⟶

120
If first IoT network is unavailable, scan for availability of second IoT network

125
If second IoT network is available, initiate connection with second IoT network

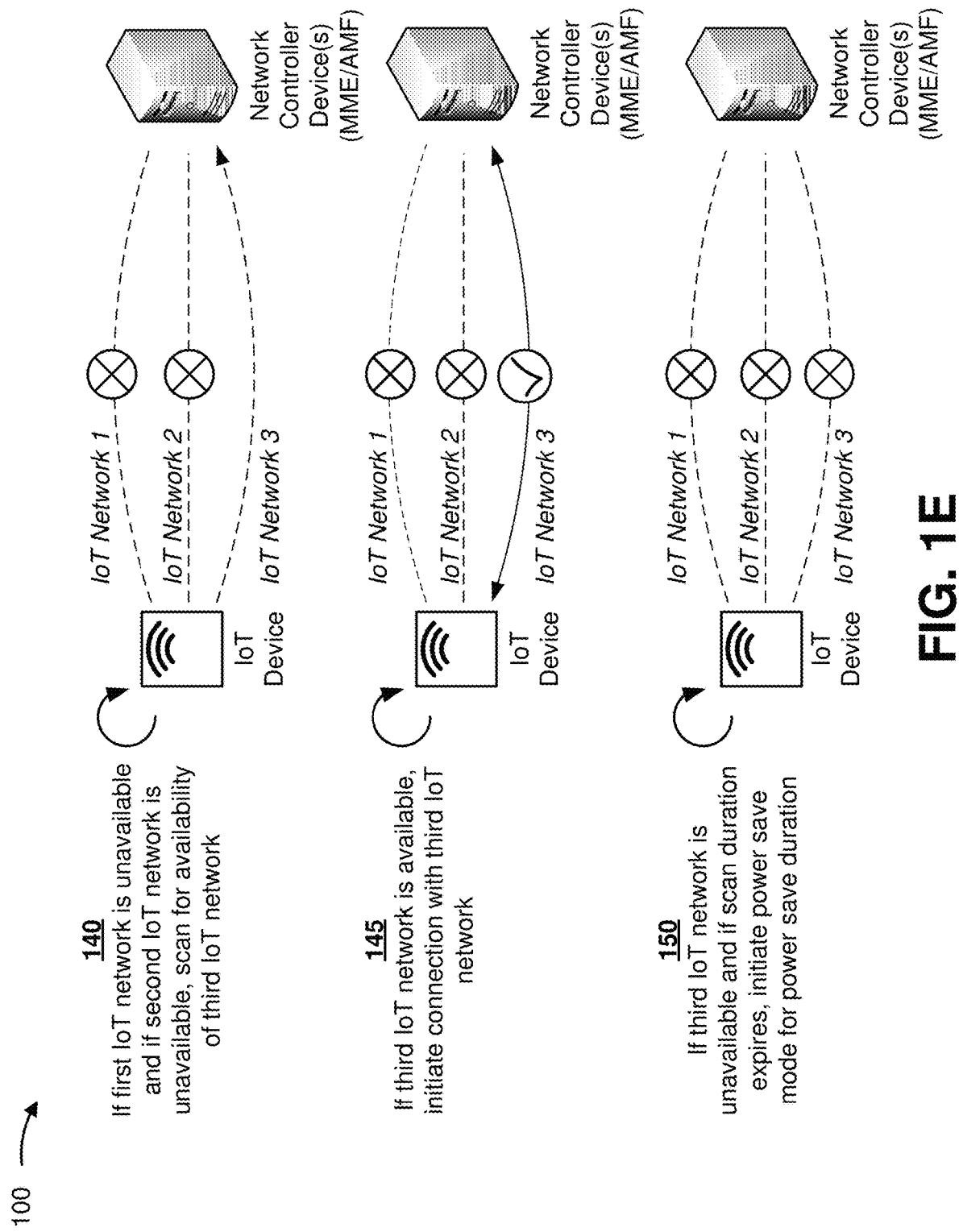

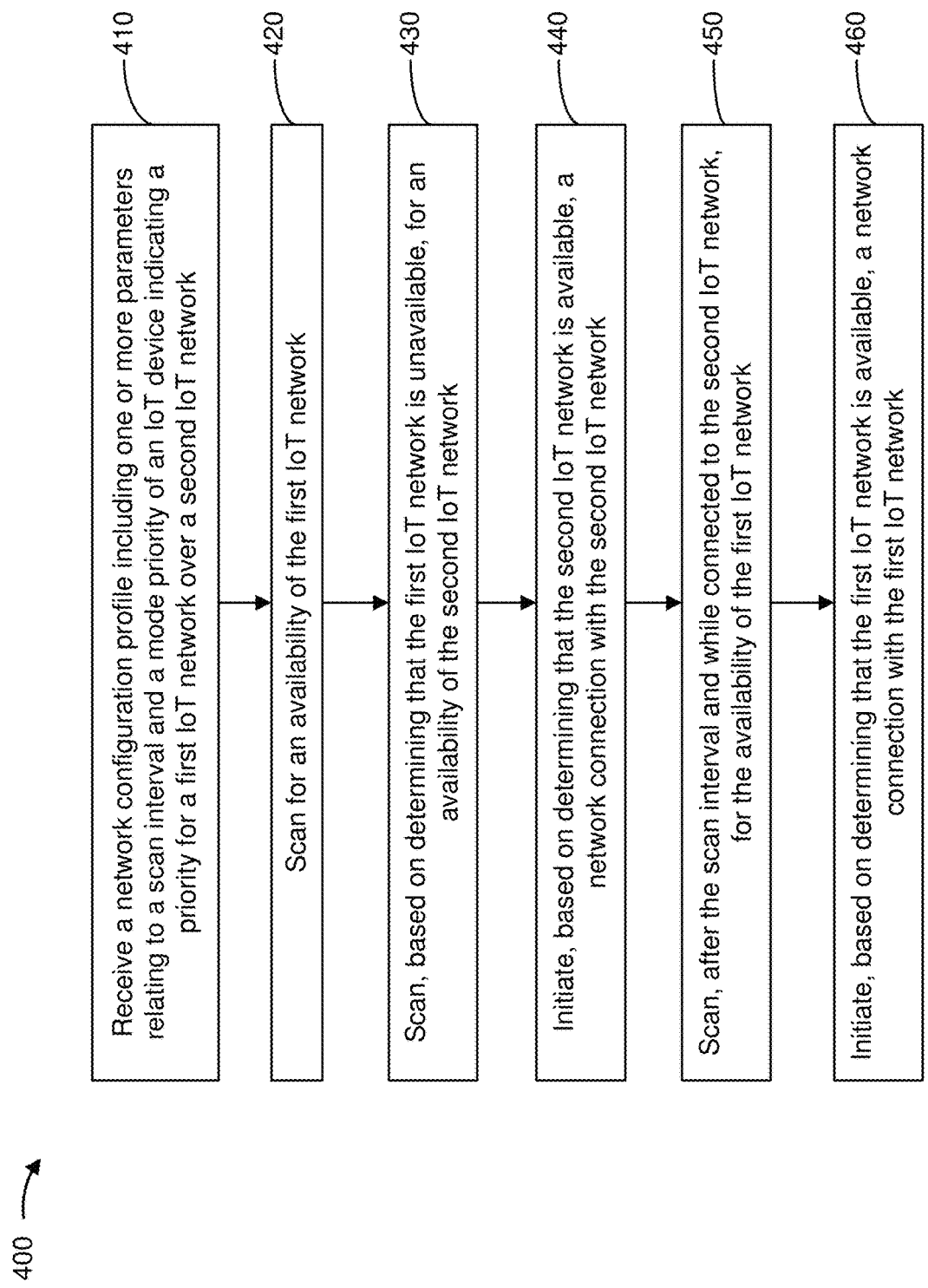

METHOD AND DEVICE FOR SELECTING A NETWORK MODE FOR AN INTERNET OF THINGS DEVICE

BACKGROUND

An Internet of Things (IoT) device may perform functions based on receiving command messages. For example, the IoT device may collect and provide sensor information, may open or close a switch, and/or the like. Different IoT devices may be associated with different instructions, different data types, different information formats, different device libraries, and/or the like. In some cases, multiple IoT devices may be implemented in a particular environment (e.g., a house, a business, a building, a train stop, and/or the like).

BRIEF DESCRIPTION OF THE DRAWINGS

FIGS. 1A-1E are diagrams of one or more example implementations described herein.

FIG. 4 is a flow chart of an example process for selecting a network mode for an IoT device.

DETAILED DESCRIPTION OF PREFERRED EMBODIMENTS

Figure 1A:
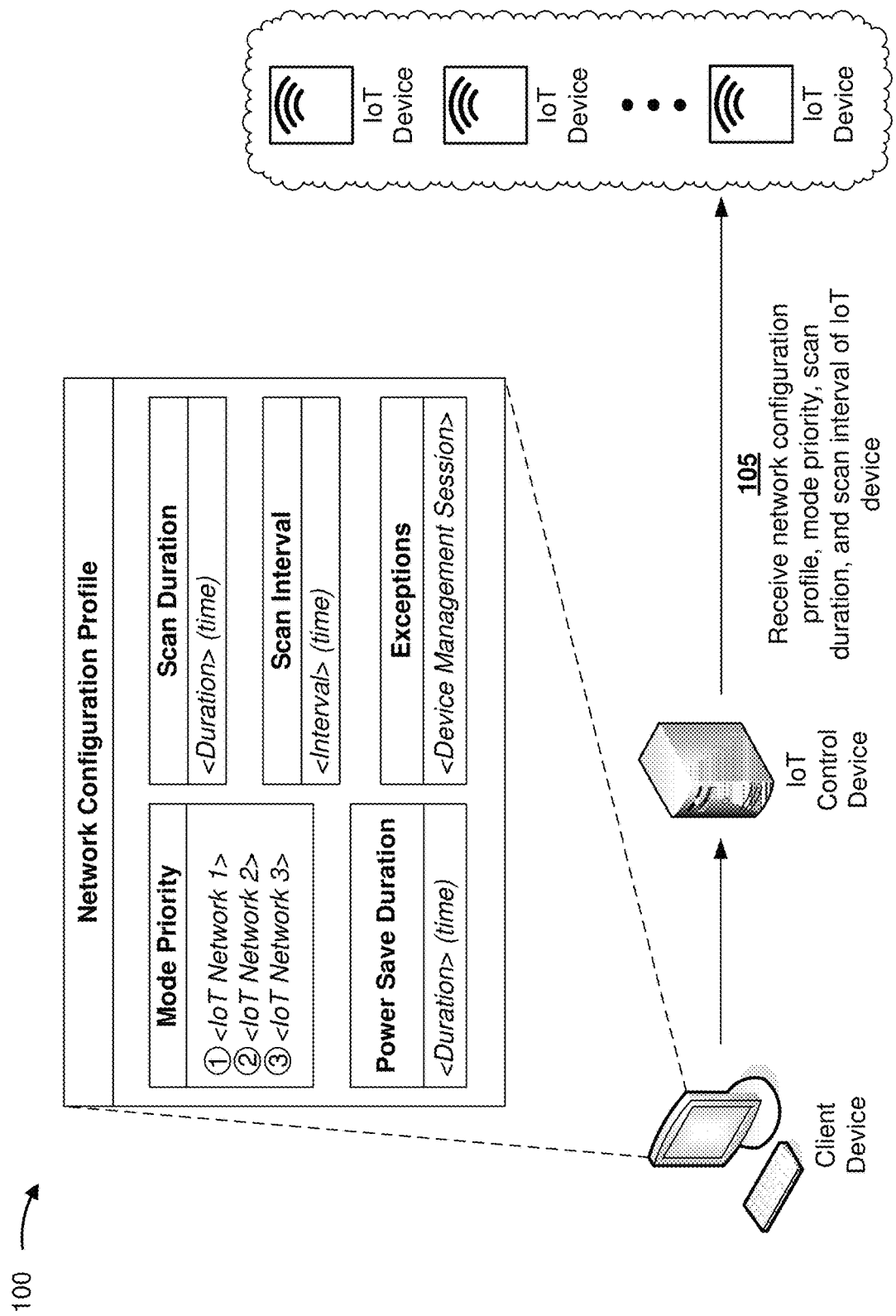

The following detailed description of example implementations refers to the accompanying drawings. The same reference numbers in different drawings may identify the same or similar elements.

As demands for real-time analytics continue to grow, increasingly more applications rely on IoT devices to supply analytics data. Many characteristics of IoT devices make IoT devices ideal for obtaining analytics data. IoT devices may be compact in size, lightweight, wireless, mobile, and applicable to a wide variety of uses. However, such characteristics also present some challenges. Due to the compact size and the mobility of IoT devices, IoT devices may be resource-constrained (e.g., having limited onboard computational, storage, communication, and/or power resources). For instance, because an IoT device may rely on an onboard battery with limited power, computations performed by the IoT device may be limited to simple operations or processes to minimize power consumption. Furthermore, a mobile IoT device may need to switch between different networks or different sites of a network as the IoT device transitions between different geographical locations. Having limited computational resources, it may be difficult for the IoT device to maintain stable connections with optimal networks. Accordingly, it can be a challenge to configure an IoT device to maintain optimal network connections while also conserving computational resources and minimizing power consumption.

An IoT device may be capable of using one of several radio access technology (RAT) modes or connecting to one of multiple different available networks (e.g., a Long-Term Evolution (LTE) category M1 network, a 5G category M1 network, an LTE category Narrow Band-Internet of Things (NB-IoT) network, a 5G category NB-IoT network, a 3G network, a 2G Global System for Mobile Communications (GSM) network, and/or the like). In some cases, an IoT device may be best suited to operate on a category M1 network or a category NB-IoT network rather than other networks (e.g., due to greater bandwidths, faster data transfer rates, less power consumption, and/or another factor). If such an optimal network is unavailable, some IoT devices may be configured to repeatedly attempt reconnecting with the optimal network. In this case, the IoT devices may remain offline, remain unproductive, and consume more power while trying to reestablish a connection with the optimal network. Some IoT devices may be configured to roam or connect to a suboptimal network to enable the IoT device to remain online. However, the IoT devices may remain connected to a suboptimal network for prolonged periods of time even when the optimal network becomes available. Operating on suboptimal networks can introduce latency, increased power consumption, and/or other adverse effects to the IoT device and/or another device connected to the IoT device.

Some implementations described herein provide an IoT device that may scan available networks for an optimal network, selectively initiate a connection with the optimal network, and maintain the connection with the optimal network in a manner that prolongs the connection without consuming excess power. In particular, the IoT device may receive a network configuration profile that configures the IoT device according to a scan interval, a scan duration, and a mode priority that indicates a priority for a first IoT network over a second IoT network. For instance, once the IoT device is powered on and/or if the IoT device detects a loss in a previously established network connection, the network configuration profile may configure the IoT device to scan for available networks (e.g., the first IoT network or the second IoT network) for the scan duration. The IoT device may scan for the first IoT network and initiate a connection with the first IoT network. If the first IoT network is unavailable, the IoT device may scan for the second IoT network and initiate a connection with the second IoT network. While connected to the second IoT network, the IoT device may scan for the first IoT network according to the scan interval and initiate a connection with the first IoT network once the first IoT network becomes available. If neither the first IoT network nor the second IoT network is available and upon expiration of the scan duration, the IoT device may initiate a power save mode before performing another scan for the first IoT network and/or the second IoT network.

In this way, the IoT device described herein may be able to stay connected to optimal networks longer while conserving power. For instance, the mode priority may help to ensure that the IoT device is connecting to an optimal network (e.g., a network that is optimal for the particular IoT device in terms of bandwidth, data transfer rate, power consumption, and/or the like). If an optimal network is unavailable, the IoT device may connect to a suboptimal network (e.g., according to the mode priority) while intermittently scanning availability of the optimal network. The IoT device may thereby remain online, switch back to the optimal network as soon as the optimal network becomes available, and minimize time spent on the suboptimal network. The IoT device may also be able to scan for a network according to a scan interval and/or a scan duration to avoid excess power consumption in trying to reestablish a network connection. A power save mode may also be initiated if none of the networks is available to further conserve power. By maintaining optimal network connections, the IoT device may also help maintain devices and systems that are connected to the IoT device in optimal operating conditions.

FIGS. 1A-1E are diagrams of one or more example implementations 100 described herein. As shown in FIGS. 1A-1E, the example implementation(s) 100 may include an IoT device, an IoT control device, a client device, and a network controller device. FIGS. 1A-1E present one or more functions that may be performed by the IoT device to scan available networks for an optimal network, selectively initiate a connection with the optimal network, and maintain the connection with the optimal network according to a network configuration profile. For instance, once the IoT device is powered on and/or if the IoT device detects a loss in a previously established network connection, the IoT device may begin scanning for available networks (e.g., the first IoT network or the second IoT network) for a predefined and/or configurable scan duration. The IoT device may scan for an availability of a first IoT network (e.g., an optimal network). If the first IoT network is unavailable, the IoT device may scan for an availability of a second IoT network (e.g., a suboptimal network), and initiate a network connection with the second IoT network if the second IoT network is available. While the device is connected to the second IoT network and after the scan interval, the IoT device may scan for the availability of the first IoT network, and initiate a network connection with the first IoT network once the first IoT network becomes available. In some examples, one or more of the functions, described as being performed by the IoT device, may be performed via another device, such as the IoT control device, the client device, and/or the like.

In some implementations, the IoT control device may be used to communicate with, configure, and/or control the IoT device (e.g., via an IoT modem that is internal to the IoT device and/or otherwise accessible to the IoT device). In some examples, the IoT control device may be associated with an application programming interface (API) that permits the client device (e.g., a computer, a smart phone, a mobile device, and/or the like) to interact with the IoT device or multiple IoT devices via the IoT control device. In some examples, an API may be associated with particular types of IoT devices and configured to interact with the IoT control device in a manner that permits the IoT devices to be controlled by the IoT control device. In some examples, the IoT control device and/or the API may be used in association with an IoT configuration service that is supported by the IoT device. For example, the IoT configuration service may be used by one or more users (e.g., a device manufacturer, a vendor, a mobile network operator, a technician, a carrier, and/or the like) to view, create, and/or edit a network configuration for the IoT device. A user may access the IoT configuration service using a client device that is connected to the IoT control device over a wired connection and/or a wireless connection.

As shown in FIG. 1A, and by reference number 105, the IoT device may receive a network configuration profile from the client device via the IoT control device. The network configuration profile may include one or more parameters relating to a mode priority. The mode priority may include information relating to one or more networks (e.g., one or more RAT modes) that are compatible with the IoT device and/or an associated application (e.g., an intended use of the IoT device). Compatibility with a network may be determined based on a bandwidth of the network, a data transfer rate of the network, a degree of mobility offered by the network, a power consumption characteristic associated with the network, a cost associated with using the network, and/or another factor. For example, the mode priority may include a priority for one or more of an LTE category M1 network, a 5G category M1 network, an LTE category NB-IoT network, a 5G category NB-IoT network, a 3G network, a 2G GSM network, and/or the like. As shown for the example in FIG. 1A, the mode priority may identify a plurality of networks that the IoT device (e.g., a dual-mode IoT device or a multi-mode IoT device) can connect to. In some examples, the mode priority may restrict the IoT device to the networks provided in the mode priority. In some examples, two or more of the networks provided in the mode priority may be managed by a common network operator. One or more of the networks provided in the mode priority may be designated and/or adjusted by a user via the client device (e.g., via access to an IoT configuration service) and transmitted to the IoT device via the IoT control device.

In some implementations, the mode priority may prioritize a network based on the IoT device and/or an associated application of the IoT device. As shown for the example in FIG. 1A, the mode priority may designate multiple networks that are prioritized in order of compatibility (e.g., ranking an optimal network first, a suboptimal network second, and a minimally compatible network last). The priority may be indicative of an order by which the IoT device is to scan for network connectivity. For example, the mode priority may designate higher priority to a category M1 network or a category NB-IoT network, and designate lower priority to a 3G network or a 2G GSM network. One network may be prioritized over another based on bandwidth, data transfer rates, mobility, power consumption characteristics, associated costs, and/or other factors. For example, a category M1 network (e.g., that has greater bandwidth and is readily adapted for mobile applications) may be prioritized for an IoT device intended for a mobile application with frequent data transmissions, whereas a category NB-IoT network (e.g., that has less bandwidth but consumes less power) may be prioritized for an IoT device intended for a fixed application with infrequent data transmissions. One or more of the priorities provided in the mode priority may be designated and/or adjusted by a user via the client device and transmitted to the IoT device via the IoT control device.

In some implementations, the network configuration profile may include one or more parameters relating to a scan duration, a scan interval, and a power save duration. The scan duration may be indicative of a duration of time that the IoT device is to scan for available networks (e.g., one or more networks specified in the mode priority). For instance, once the IoT device is powered on and/or if the IoT device detects a loss in a previously established network connection, the IoT device may scan for available networks for the scan duration. If a network is not available upon expiration of the scan duration, the IoT device may initiate a power save mode of operation (e.g., a sleep mode, a hibernate mode, and/or another power conservation mode). The power save duration of the network configuration profile may be indicative of a duration of time that the IoT device is to remain in the power save mode once the power save mode is initiated and/or before scanning for available networks. The scan interval may be indicative of a duration of time that the IoT device is to wait before scanning for a network. The scan duration, the scan interval, and/or the power save duration may be configured to limit the time the IoT device spends on scanning for available networks and to conserve power. The scan duration, the scan interval, and/or the power save duration may be fixed, variable, and/or configurable by a user via the client device, and transmitted to the IoT device via the IoT control device.

In some implementations, the network configuration profile may include one or more parameters relating to one or more exceptions to the mode priority. An exception may be provided for a device management session (e.g., an Open Mobile Alliance Device Management (OMADM) session, a Firmware Over-The-Air (FOTA) session, and/or the like). A device management session may include a process that is specific to hardware, firmware, and/or software of the IoT device, and/or managed separately from an application associated with the IoT device. For example, a device management session may include a process relating to provisioning the IoT device, configuring the IoT device, updating software and/or firmware of the IoT device, diagnosing the IoT device, troubleshooting the IoT device, and/or another process that may be critical to the IoT device and/or require a stable connection for a duration of the process. An exception to the mode priority may cause the IoT device to temporarily disable the mode priority for a duration of the device management session, and cause the IoT device to connect to a network specified by the device management session irrespective of the mode priority. One or more of the exceptions to the mode priority may be configured, added, and/or adjusted by a user via the client device, and transmitted to the IoT device via the IoT control device.

In some implementations, the network configuration profile may include other parameters than shown. For example, if the IoT device supports different types of power save modes, the network configuration profile may include different power save durations for the different types of power save modes. In some examples, the network configuration profile may include different sets of scan durations and scan intervals for scanning different networks. Additionally, or alternatively, the network configuration profile may include different sets of mode priorities that are selectively applied based on different applications associated with the IoT device, different geographical locations, and/or the like. In some examples, the network configuration profile may include one or more parameters relating to an exception duration corresponding to a maximum duration of time that the IoT device is to remain in a device management session (e.g., to prevent completely discharging a battery of the IoT device in the event the device management session stalls). In some examples, the network configuration profile may be selected from a plurality of network configuration profiles that is stored on the client device, the IoT control device, and/or otherwise accessible to the IoT device.

In some implementations, one or more of the parameters (e.g., the mode priority, the scan duration, the scan interval, the power save duration, and/or the like) of the network configuration profile may be designated and/or adjusted by a user via the client device. Additionally, or alternatively, one or more of the parameters of the network configuration profile may be automatically designated and/or adjusted by the client device and/or the IoT control device using a machine learning model. For example, the client device and/or the IoT control device may train the machine learning model using historic data relating to the IoT device, such as a parameter of the network configuration profile that was used to configure the IoT device, an environment of the IoT device (e.g., a geographic location of a fixed IoT device, a change in geographic location of a mobile IoT device, and/or the like), an application the IoT device was used for, and/or an outcome (e.g., a quality of a performance of the IoT device while configured with the parameter, a quality of a connection that was established using the parameter, and/or the like). Based on the historic data, the machine learning model may be trained to identify trends between different parameters that were used to configure the IoT device and associated outcomes, determine an optimal parameter for the IoT device based on the trends, and automatically populate the network configuration profile with the optimal parameter.

In some implementations, the machine learning model may be stored within the client device, the IoT control device, and/or another device that is accessible to the client device and/or the IoT control device (e.g., a network storage device, a network computing device, a cloud computing device, and/or the like). In some examples, the machine learning model may be generated and/or trained by the client device and/or the IoT control device. In some examples, another device (e.g., a network computing device, a cloud computing device, and/or the like) may generate and/or train the machine learning model, and provide the generated and/or trained machine learning model for use by the client device and/or the IoT control device. Additionally, or alternatively, the client device and/or the IoT control device may train the machine learning model for use by another device (e.g., a network computing device, a cloud computing device, and/or the like). The machine learning model may be updated (e.g., on a scheduled basis, on an on-demand basis, on a triggered basis, on a periodic basis, and/or the like) by the client device, the IoT control device, and/or another device (e.g., a network computing device, a cloud computing device, and/or the like).

In some implementations, the client device and/or the IoT control device may perform a training operation when generating the machine learning model. For example, the client device and/or the IoT control device may portion the historic data into a training set (e.g., a set of data to train the model), a validation set (e.g., a set of data used to evaluate a fit of the model and/or to fine tune the model), a test set (e.g., a set of data used to evaluate a final fit of the model), and/or the like. In some examples, the client device and/or the IoT control device may preprocess and/or perform dimensionality reduction to reduce the historic data to a minimum feature set. In some examples, the client device and/or the IoT control device may train the machine learning model on this minimum feature set, thereby reducing processing to train the machine learning model, and may apply a classification technique, to the minimum feature set.

In some implementations, the client device and/or the IoT control device may use a classification technique, such as a logistic regression classification technique, a random forest classification technique, a gradient boosting machine learning (GBM) technique, and/or the like, to determine a categorical outcome (e.g., that an optimal network connection is likely established, that an optimal network connection is likely not established, and/or the like). In some examples, the client device and/or the IoT control device may use a naïve Bayesian classifier technique, performing binary recursive partitioning to split the data of the minimum feature set into partitions and/or branches and using the partitions and/or branches to perform predictions (e.g., that an optimal network connection is likely established, that an optimal network connection is likely not established, and/or the like). Based on recursive partitioning, the client device and/or the IoT control device may reduce utilization of computing resources relative to manual, linear sorting and analysis of data points, and thereby enable use of thousands, millions, or billions of data points to provide a more accurate model.

In some implementations, the client device and/or the IoT control device may use a support vector machine (SVM) classifier technique to generate a non-linear boundary between data points in the training set. In this case, the non-linear boundary may be used to classify test data (e.g., data relating a parameter of the network configuration profile) into a particular class (e.g., a class indicating that an optimal network connection is likely established, a class indicating that an optimal network connection is likely not established, and/or the like).

In some implementations, the client device and/or the IoT control device may train the machine learning model using a supervised training procedure that includes receiving input to the model from a subject matter expert, which may reduce an amount of time, an amount of processing resources, and/or the like to train the machine learning model relative to an unsupervised training procedure. In some examples, the client device and/or the IoT control device may use one or more other model training techniques, such as a neural network technique, a latent semantic indexing technique, and/or the like. For example, the client device and/or the IoT control device may perform an artificial neural network processing technique (e.g., using a two-layer feedforward neural network architecture, a three-layer feedforward neural network architecture, and/or the like) to perform pattern recognition with regard to patterns of whether a parameter of the network configuration profile can establish an optimal network connection or not. In this case, using the artificial neural network processing technique may improve an accuracy of the machine learning model generated by the client device and/or the IoT control device by being more robust to noisy, imprecise, or incomplete data, and by enabling the client device and/or the IoT control device to detect patterns and/or trends undetectable to human analysts or systems using less complex techniques.

In some implementations, the client device and/or the IoT control device may determine, using a linear regression technique, that a threshold percentage of parameters of the network configuration profile likely do not establish an optimal network connection, and may determine that those parameters are to receive relatively low association scores. In contrast, the client device and/or the IoT control device may determine that another threshold percentage of parameters of the network configuration profile likely establish an optimal network connection and may assign a relatively high association score to those parameters. Based on such characteristics of the parameters, the client device and/or the IoT control device may generate and/or train the machine learning model and may use the machine learning model for analyzing new parameters, and/or the like) that the client device and/or the IoT control device identifies.

Figure 1B:
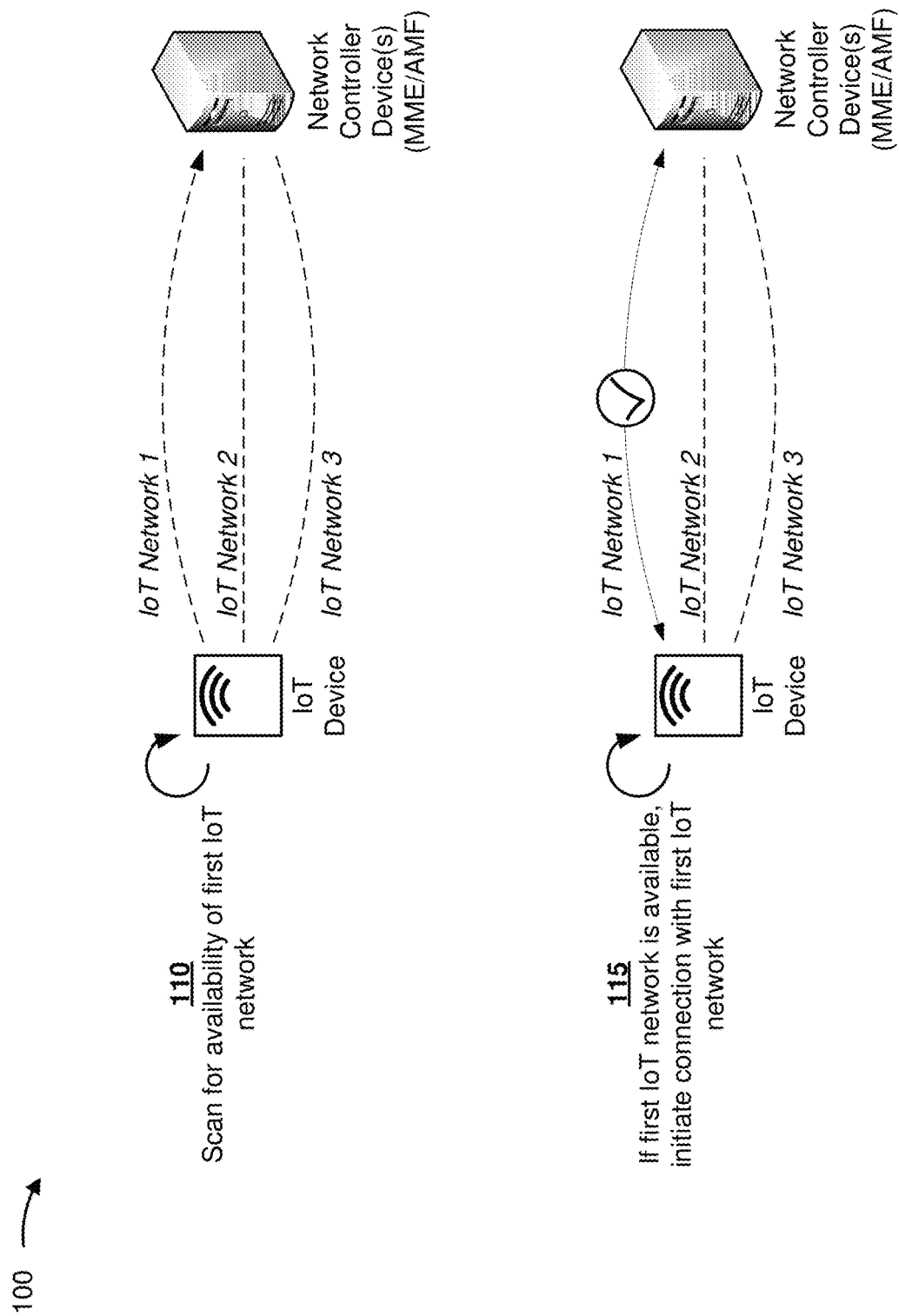

As shown in FIG. 1B, and by reference number 110, the IoT device may scan for an availability of a first IoT network (e.g., IoT Network 1) according to the mode priority of the network configuration profile. For example, the mode priority may designate the first IoT network as an optimal network for the IoT device (e.g., given a higher priority based on a high degree of compatibility with the IoT device and/or an associated application). In some examples, the first IoT network may be a category M1 network (e.g., if the IoT device is intended for use with a mobile application with frequent data transmissions), or a category NB-IoT network (e.g., if the IoT device is intended for use with a fixed application with infrequent data transmissions). The IoT device may determine whether a network signal corresponding to the first IoT network (e.g., the optimal network) is available, and attempt to establish a network connection with the first IoT network if available. For example, the IoT device may attempt to communicate with a network controller device (e.g., a mobility management entity (MME) device, an access and mobility management function (AMF) device, and/or the like) of a radio access network (RAN) associated with the first IoT network.

As further shown in FIG. 1B, and by reference number 115, the IoT device may initiate a network connection with the first IoT network if the first IoT network is available. In some implementations, the IoT device may cause the network connection to be established via the network controller device associated with the first IoT network. For example, if the network controller device of the first IoT network is responsive, the IoT device may transmit a service request to the network controller that requests the network controller to register and authenticate the IoT device to the first IoT network (e.g., according to an Evolved Packet System Mobility Management (EMM) protocol, and/or the like). In response, the network controller device may register and authenticate the IoT device to the first IoT network, and establish the network connection with the IoT device. In some examples, if the IoT device detects a loss in a previously established network connection with the first IoT network, the IoT device may scan for the first IoT network before scanning for another network.

Figure 1C:
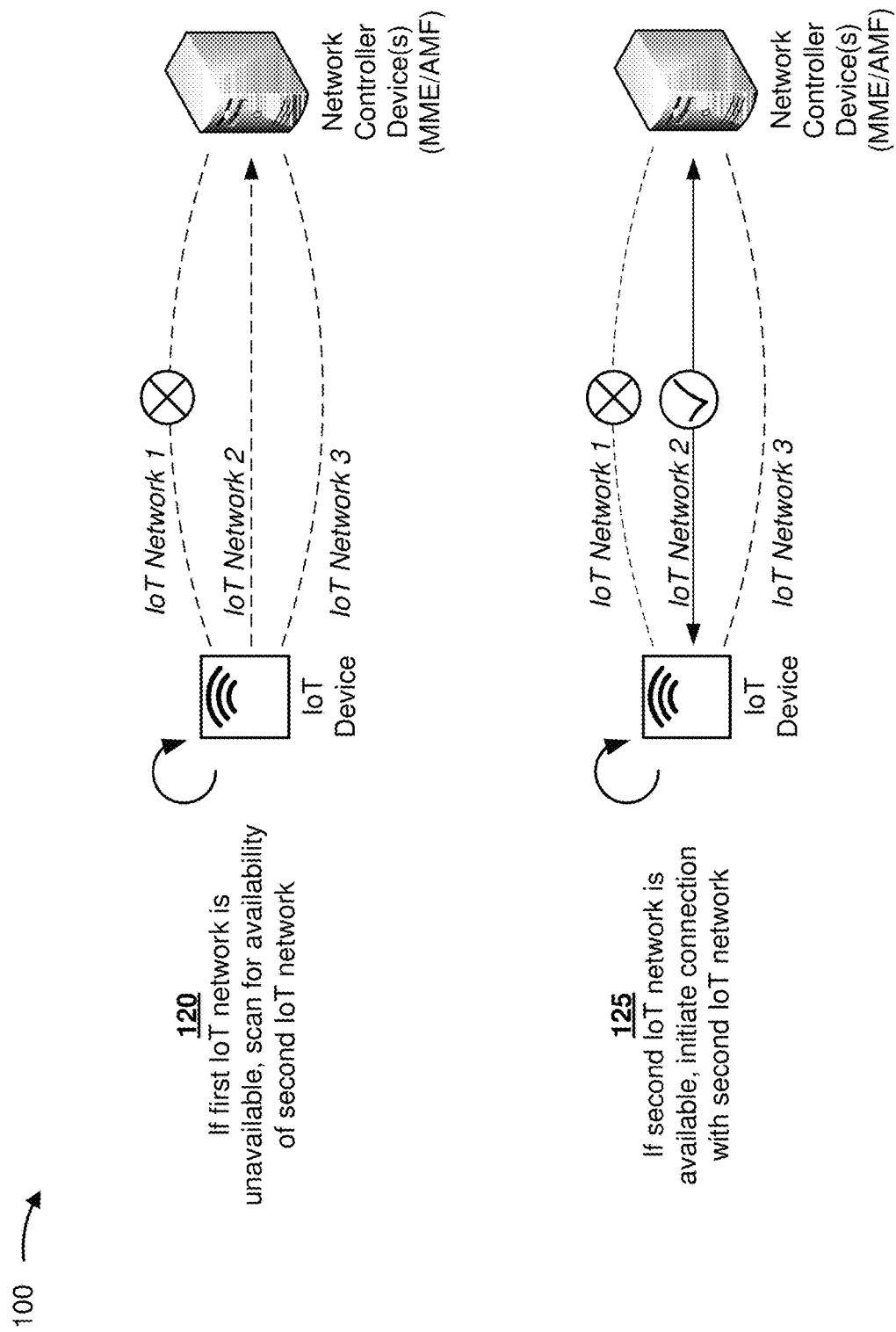

As shown in FIG. 1C, and by reference number 120, the IoT device may scan for an availability of a second IoT network (e.g., IoT Network 2) according to the mode priority of the network configuration profile if the first IoT network is unavailable (e.g., if a network controller device of the first IoT network is unreachable and/or unable to register and authenticate the IoT device). For example, the IoT device may cease scanning for the first IoT network, determine whether a network signal corresponding to the second IoT network is available, and attempt to initiate a network connection with the second IoT network (e.g., via a network controller device of a RAN associated with the second IoT network). The second IoT network may be designated as a suboptimal network for the IoT device (e.g., given a lower priority relative to the first IoT network based on a lower degree of compatibility with the IoT device and/or an associated application). In some examples, if the first IoT network is a category M1 network, the mode priority may designate the second IoT network as a category NB-IoT network. In some examples, if the first IoT network is a category NB-IoT network, the mode priority may designate the second IoT network as a category M1 network.

As further shown in FIG. 1C, and by reference number 125, the IoT device may initiate a network connection with the second IoT network if the second IoT network is available. In some implementations, the IoT device may cause the network connection to be established via the network controller device associated with the second IoT network. For example, if the network controller device of the second IoT network is responsive, the IoT device may transmit a service request to the network controller of the second IoT network requesting registration and authentication of the IoT device to the second IoT network (e.g., according to an EMM protocol and/or the like). In response, the network controller device associated with the second IoT network may register and authenticate the IoT device to the second IoT network, and establish the network connection with the IoT device.

Figure 1D:
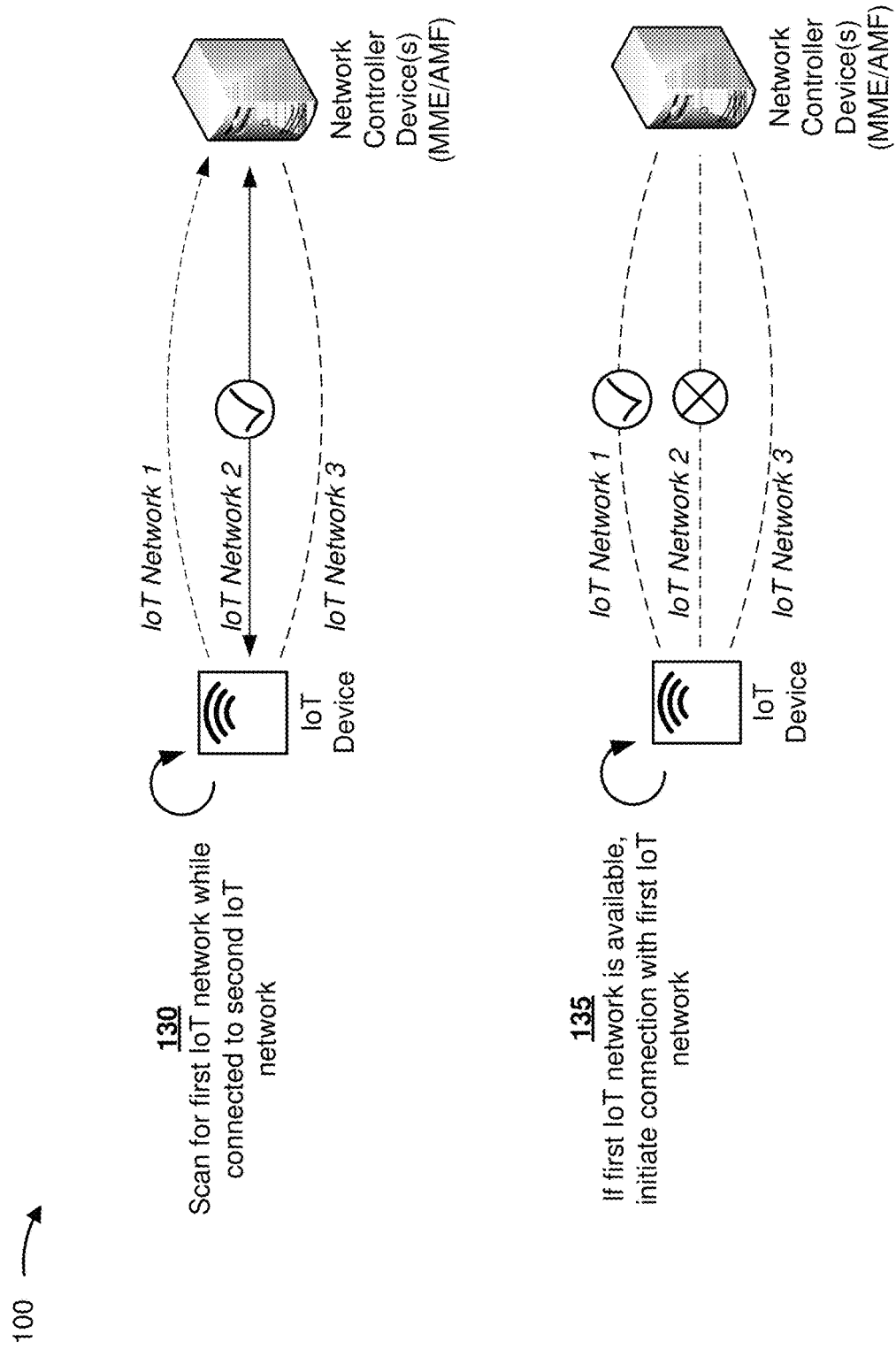

As shown in FIG. 1D, and by reference number 130, the IoT device may scan for an availability of the first IoT network while maintaining the network connection with the second IoT network. In some examples, the IoT device may wait for a scan interval (e.g., as provided in the network configuration profile) while connected to the second IoT network before scanning for the first IoT network. For example, upon establishing the network connection with the second IoT network, the IoT device may initiate a scan interval timer that is limited to the scan interval, and begin scanning for the first IoT network upon expiration of the scan interval timer. Once the IoT device begins to scan for the first IoT network, the IoT device may attempt to establish communication with the network controller device of the first IoT network.

In some implementations, such as if the first IoT network is unavailable, the IoT device may cease scanning for the first IoT network, remain connected to the second IoT network, and wait for another scan interval before scanning for the first IoT network again. The IoT device may repeat this scan cycle (e.g., continue scanning according to the scan interval) for as long as the second IoT network remains available and as long as the first IoT network remains unavailable. In some examples, the network configuration profile may include a scan cycle count limit that limits a number of scan cycles the IoT device may perform while connected to the second IoT network and/or another network. In some examples, the scan interval used by the IoT device to scan for the first IoT network while connected to the second IoT network may remain consistent (e.g., having same durations of time) for subsequent scan cycles. In some examples, a scan interval used for a subsequent scan cycle may be for a shorter duration or a longer duration than a scan interval used for a prior scan cycle. For example, subsequent scan cycles may have gradually shorter scan intervals or gradually longer scan intervals.

As further shown in FIG. 1D, and by reference number 135, the IoT device may initiate a network connection with the first IoT network if the first IoT network is available. The IoT device may cause the network connection to be established via the network controller device associated with the first IoT network. For example, if the network controller device of the first IoT network is responsive, the IoT device may transmit a service request to the network controller of the first IoT network requesting registration and authentication of the IoT device to the first IoT network (e.g., according to an EMM protocol and/or the like). In response, the network controller device associated with the first IoT network may register and authenticate the IoT device to the first IoT network, and establish the network connection with the IoT device. The IoT device may establish the network connection with the first IoT network before disconnecting with the second IoT network (e.g., via a make-before-break switching technique), or disconnect with the second IoT network before establishing the network connection with the first IoT network (e.g., via a break-before-make switching technique). In some examples, the IoT device may dynamically select the switching technique to apply based on a parameter of the network configuration profile, an attribute of the networks being switched, an attribute of an application associated with the IoT device, and/or the like.

As shown in FIG. 1E, and by reference number 140, the IoT device may scan for an availability of a third network (e.g., IoT Network 3) according to the mode priority of the network configuration profile if the first IoT network and the second IoT network are unavailable (e.g., if neither the network controller device of the first IoT network nor the network controller device of the second IoT network is reachable and/or able to register and authenticate the IoT device). For example, the IoT device may determine whether a network signal corresponding to the third network is available, and attempt to initiate a network connection with the third network (e.g., via a network controller device of a RAN associated with the third network). The third network may be designated as a minimally compatible network for the IoT device (e.g., given a lower priority relative to the first IoT network and the second IoT network based on a lower degree of compatibility with the IoT device and/or an associated application). In some examples, the mode priority may designate the third network as a 3G network or a 2G GSM network.

As further shown in FIG. 1E, and by reference number 145, the IoT device may initiate a network connection with the third network if the third network is available. In some implementations, the IoT device may cause the network connection to be established via the network controller device associated with the third network. For example, if the network controller device of the third network is responsive, the IoT device may transmit a service request to the network controller of the third network requesting registration and authentication of the IoT device to the third network (e.g., according to an EMM protocol and/or the like). In response, the network controller device associated with the third network may register and authenticate the IoT device to the third network, and establish the network connection with the IoT device.

As further shown in FIG. 1E, and by reference number 150, the IoT device may initiate a power save mode for a power save duration if the third network is unavailable and if a scan duration expires. For example, once the IoT device is powered on and/or if the IoT device detects a loss in a previously established network connection, the IoT device may scan for available networks (e.g., the first IoT network, the second IoT network, or the third network according to the mode priority) for the scan duration. The IoT device may initiate a scan duration timer that is limited to the scan duration (e.g., as provided in the network configuration profile), and attempt to establish communication with one or more network controller devices of one or more corresponding available networks until the scan duration timer expires. If a network connection is successfully established prior to expiration of the scan duration, the IoT device may stop, cancel, and/or otherwise disable the scan duration timer (e.g., until the IoT device subsequently power cycles and/or loses the network connection). If a network connection is not successfully established prior to expiration of the scan duration, the IoT device may initiate a power save mode of operation and/or the like to conserve power.

In some implementations, if the network controller device of the third network is unresponsive or otherwise fails to register and/or authenticate the IoT device to the third network before expiration of the scan duration, the IoT device may cease scanning for networks and initiate the power save mode (e.g., a sleep mode, a hibernate mode, and/or another power conservation mode of operation). Upon initiating the power save mode, the IoT device may initiate a power save duration timer that is limited to the power save duration (e.g., as provided in the network configuration profile), and remain in the power save mode until the power save duration time expires. Upon expiration of the power save duration timer, the IoT device may exit the power save mode, restart the scan duration timer, and continue scanning for available networks (e.g., the first IoT network, the second IoT network, and/or the third network), as previously discussed. In some examples, the IoT device may resume scanning for the third network upon exiting the power save mode. In some examples, the IoT device may scan for the first IoT network and the second IoT network before scanning for the third network (e.g., according to the mode priority) upon exiting the power save mode.

In some implementations, such as if the third network is unavailable but the scan duration has not expired, the IoT device may scan for the first IoT network, the second IoT network, and the third network again (e.g., according to the mode priority), as previously discussed. The IoT device may continue scanning for the first IoT network, the second IoT network, and the third network until a network connection is established or until the scan duration expires. In some examples, if the third network is unavailable but the scan duration has not expired, the IoT device may continue scanning for the third network. If communication with the network controller device of the third network is successful prior to expiration of the scan duration, the IoT device may successfully establish a network connection with the third network (e.g., registered and authenticated with the third network via the network controller device of the third network). If the IoT device detects a loss in the network connection with the third network, the IoT device may scan for the first IoT network, the second IoT network, and/or the third network for another scan duration.

In some implementations, the IoT device may initiate the power save mode in response to other events. For example, the IoT device may initiate the power save mode in response to determining that the first IoT network is unavailable and/or in response to determining that the second IoT network is unavailable. In some examples, the IoT device may initiate the power save mode in between scan intervals, and/or the like. Furthermore, although the mode priority of the network configuration profile described herein is provided in relation to three networks, the mode priority in some implementations may include fewer than three networks or more than three networks. Correspondingly, the IoT device may initiate the power save mode in response to determining that a last one of the networks of the mode priority (e.g., a minimally compatible network) is unavailable.

In some implementations, the IoT device may operate according to one or more exceptions (e.g., for an OMADM session, a FOTA session, and/or the like) to the mode priority. If a device management session is initiated (e.g., via the client device, the IoT control device, the network controller device, and/or the like), the IoT device may temporarily disable the mode priority for a duration of the device management session, and connect to a network specified by the device management session. If the IoT device is connected to a different network than the network specified by the device management session, the IoT device may switch to the network specified by the device management session. If the IoT device is already connected to the network specified by the device management session, the IoT device may remain connected to the network. Upon completion of the device management session, the IoT device may reenable the mode priority and switch to an optimal network (e.g., if the network specified by the device management session is different from the optimal network provided by the mode priority), or remain on the network specified by the device management session (e.g., if the network specified by the device management session is the optimal network). The IoT device may switch between network connections via a make-before-break switching technique, a break-before-make switching technique, and/or the like.

In this way, the IoT device described herein may be able to stay connected to optimal networks longer while conserving power. For instance, the mode priority may help to ensure that the IoT device is connecting to an optimal network (e.g., a network that is optimal for the particular IoT device in terms of bandwidth, data transfer rate, power consumption, and/or the like). If an optimal network is unavailable, the IoT device may connect to a suboptimal network (e.g., according to the mode priority) while intermittently scanning availability of the optimal network. The IoT device may thereby remain online, switch back to the optimal network as soon as the optimal network becomes available, and minimize time spent on the suboptimal network. The IoT device may also be able to scan for a network according to scan intervals and/or scan durations to avoid excess power consumption in trying to reestablish a network connection. A power save mode may also be initiated if none of the networks is available to further conserve power. By maintaining optimal network connections, the IoT device may also help maintain devices and systems that are connected to the IoT device in optimal operating conditions.

As indicated above, FIGS. 1A-1E are provided as one or more examples. Other examples can differ from what is described with regard to FIGS. 1A-1E. For example, in some implementations, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) in implementation(s) 100 may perform one or more functions described as being performed by another set of devices in implementation(s) 100.

Figure 2:
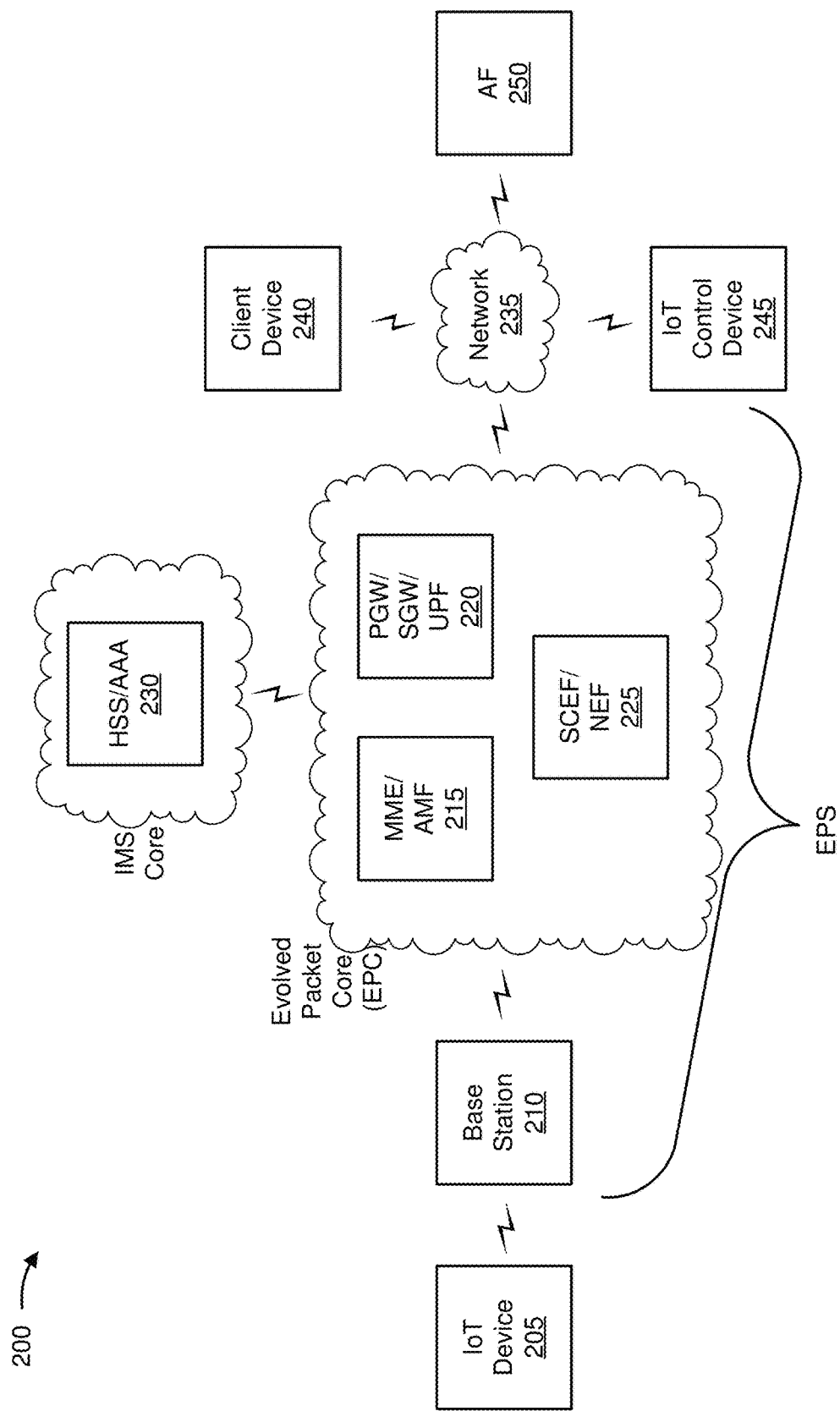
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include an IoT device 205, a base station 210, a MME/AMF 215, a packet data network gateway (PGW)/serving gateway (SGW)/user plane function (UPF) 220, a service capability exposure function (SCEF)/network exposure function (NEF) 225, a home subscriber server (HSS)/authentication, authorization, and accounting server (AAA) 230, a network 235, a client device 240, an IoT control device 245, and an application function (AF) 250. Devices of environment 200 may interconnect via wired connections, wireless connections, or a combination of wired and wireless connections.

Environment 200 includes an evolved packet system (EPS) that includes an LTE network, a 5G network, and/or an evolved packet core (EPC). The EPS may include a RAN that includes one or more base stations 210 that take the form of an LTE evolved NodeB (eNB) or a 5G next generation NodeB (gNB) (e.g., for supporting an LTE category M1 network, a 5G category M1 network, an LTE category NB-IoT network, a 5G category NB-IoT network, and/or another RAT mode) via which IoT device 205 communicates with the EPC. The EPC may include MME/AMF 215, PGW/SGW/UPF 220, and/or SCEF/NEF 225, that enable IoT device 205 to communicate with network 235 and/or an Internet protocol multimedia subsystem (IMS) core. The IMS core may include HSS/AAA 230, and may manage device registration and authentication, session initiation, and/or the like, associated with IoT device 205. HSS/AAA 230 may reside in the EPC and/or the IMS core. In some implementations, the EPS may support other RAT modes (e.g., a 3G network, a 2G GSM network, and/or the like).

IoT device 205 includes one or more devices capable of gathering, receiving, storing, processing, providing, and/or transmitting information and/or data. For example, IoT device 205 may include a network device (e.g., a modem, a switch, a gateway, or the like), a sensing device, a metering device, a mobile phone (e.g., a smart phone, a radiotelephone, or the like), a computing device (e.g., a server, a desktop computer, a laptop computer, a tablet computer, a handheld computer, a camera, an audio recorder, a camcorder, or the like), an appliance (e.g., a thermostat, an oven, a refrigerator, a microwave, a stove, or the like), a medical device, a biometric device, a wearable device, an automobile, an airplane, a railcar, a light bulb, a switch, an actuator, a timer, a signal detection device (e.g., to detect the presence of a signal, such as a Bluetooth signal, an infrared signal, or the like), a machine-to-machine (M2M) device, and/or a similar device. In other words, IoT device 205 may be any "thing" in the IoT. In some implementations, IoT device 205 may include an interface for short range wireless communication protocols (e.g., Bluetooth low energy, Institute of Electrical and Electronics Engineers (IEEE) 802.15.4 ZigBee, and/or the like) and/or long range wireless communication protocols (e.g., LTE category M1, 5G category M1, LTE category NB-IoT, 5G category NB-IoT, 3G, 2G GSM, and/or the like) that may allow IoT device 205 to receive information from and/or transmit information to another device in environment 200.

Base station 210 includes one or more devices capable of transferring traffic, such as audio, video, text, and/or other traffic, destined for and/or received from IoT device 205. In some implementations, base station 210 may include an eNB or a gNB associated with the EPS that receives traffic from and/or sends traffic to network 235 via PGW/SGW/UPF 220. Additionally, or alternatively, one or more base stations 210 may be associated with a RAN that is not associated with the EPS. Base station 210 may send traffic to and/or receive traffic from IoT device 205 via an air interface. In some implementations, base station 210 may include a small cell base station, such as a base station of a microcell, a picocell, and/or a femtocell.

MME/AMF 215 includes one or more devices, such as one or more server devices, capable of managing authentication, activation, deactivation, and/or mobility functions associated with IoT device 205. In some implementations, MME/AMF 215 may perform operations relating to authentication of IoT device 205. Additionally, or alternatively, MME/AMF 215 may facilitate the selection of a particular PGW/SGW/UPF 220 to serve traffic to and/or from IoT device 205. MME/AMF 215 may perform operations associated with handing off IoT device 205 from a first base station 210 to a second base station 210 when IoT device 205 is transitioning from a first coverage area associated with the first base station 210 to a second coverage area associated with the second base station 210. Additionally, or alternatively, MME/AMF 215 may select another MME/AMF (not pictured), to which IoT device 205 should be handed off (e.g., when IoT device 205 moves out of range of MME/AMF 215).

PGW/SGW/UPF 220 includes one or more devices capable of routing packets. For example, PGW/SGW/UPF 220 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, PGW/SGW/UPF 220 may aggregate traffic received from one or more base stations 210 associated with the EPS, and may send the aggregated traffic to network 235 and/or other network devices associated with the EPC and/or the IMS core. PGW/SGW/UPF 220 may also receive traffic from network 235 and/or other network devices, and may send the received traffic to IoT device 205 via base station 210. Additionally, or alternatively, PGW/SGW/UPF 220 may perform operations associated with handing off IoT device 205 to and/or from an EPS.

SCEF/NEF 225 includes one or more devices capable of providing an interface between AF 250 and IoT device 205. SCEF/NEF 225 may expose the services and/or capabilities of AF 250 to IoT device 205. SCEF/NEF 225 may support the exposure of capabilities and/or events in the EPS to help other entities in the EPS discover network services and/or utilize network resources efficiently. SCEF/NEF 225 may communicate with AF 250 via an application programming interface (API). MME/AMF 215 may communicate with SCEF/NEF 225 through a dedicated interface protocol. SCEF/NEF 225 may maintain information associating IoT device 205 with a particular HSS/AAA 230 that stores the subscriber profile for IoT device. Furthermore, SCEF/NEF 225 may manage device groups, request generation of subgroups of HSS/AAA 230 for device groups, and/or generate a mapping between a device group and corresponding subgroups of HSS/AAA 230.

HSS/AAA 230 may include one or more devices, such as one or more server devices, capable of managing (e.g., receiving, generating, storing, processing, and/or providing) information associated with IoT device 205. For example, HSS/AAA 230 may manage subscription information associated with IoT device 205, such as information that identifies a subscriber profile of a user associated with IoT device 205, information that identifies services and/or applications that are accessible to IoT device 205, location information associated with IoT device 205, a network identifier (e.g., a network address) that identifies IoT device 205, information that identifies a treatment of IoT device 205 (e.g., quality of service information, a quantity of minutes allowed per time period, a quantity of data consumption allowed per time period, and/or the like), and/or similar information.

In some implementations, HSS/AAA 230 may perform authentication, authorization, and/or accounting operations for communication sessions associated with IoT device 205. For example, HSS/AAA 230 may perform authentication operations for IoT device 205 and/or a user of IoT device 205 (e.g., using one or more credentials), may control access, by IoT device 205, to a service and/or an application (e.g., based on one or more restrictions, such as time-of-day restrictions, location restrictions, single or multiple access restrictions, read/write restrictions, and/or the like), may track resources consumed by IoT device 205 (e.g., a quantity of data consumed and/or the like), and/or may perform similar operations. HSS/AAA 230 may provide this information to one or more other devices of environment 200 to support the operations performed by those devices.

Network 235 includes one or more wired and/or wireless networks. For example, network 235 may include a cellular network (e.g., an LTE network, a 5G network, a 3G network, a code division multiple access (CDMA) network, and/or the like), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Client device 240 includes one or more devices capable of receiving, generating, storing, processing, and/or providing information associated with configuring IoT device 205 (e.g., via a network configuration profile). For example, client device 240 may include a computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. In some implementations, client device 240 may include a communication interface that allows client device 240 to receive information from and/or transmit information to other devices in environment 200, such as IoT device 205, IoT control device 245, AF 250, and/or the like.

IoT control device 245 may include a device capable of receiving, generating, storing, processing, and/or providing information. For example, IoT control device 245 may include a communication and computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a set-top box, a server device, or a similar device. In some implementations, IoT control device 245 may include a communication interface that allows IoT control device 245 to communicate with IoT device 205. For example, IoT control device 245 may include a modem, a router, a gateway, or a similar device. Additionally, or alternatively, IoT control device 245 may communicate with one or more IoT devices 205 (e.g., via a wired connection, via a wireless connection, via a combination of wired and wireless connections, via a wireless local area network, such as a Wi-Fi network, a Bluetooth network, a near field communication network, or the like, and/or the like). In some implementations, IoT control device 245 may include a communication interface that allows IoT control device 245 to receive information from and/or transmit information to another device in environment 200.

AF 250 includes one or more devices, such as computer devices and/or other network devices, which receive uplink data from IoT device 205 and/or which send downlink data to IoT device 205. For example, AF 250 may be capable of receiving location information from IoT device 205, receiving requests for instructions from IoT device 205, receiving requests for updates from IoT device 205, receiving sensor data from IoT device 205, receiving reports from IoT device 205, such as error reports and/or health status reports, and/or receiving other types of information from IoT device 205. Additionally, or alternatively, AF 250 may be capable of sending instructions to perform a particular action by IoT device 205, sending authentication information to IoT device 205, sending a query for a particular type of information to IoT device 205, sending updates to IoT device 205, sending sensor data to IoT device 205, sending control instructions to IoT device 205, and/or sending other types of data and/or instructions to IoT device 205.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
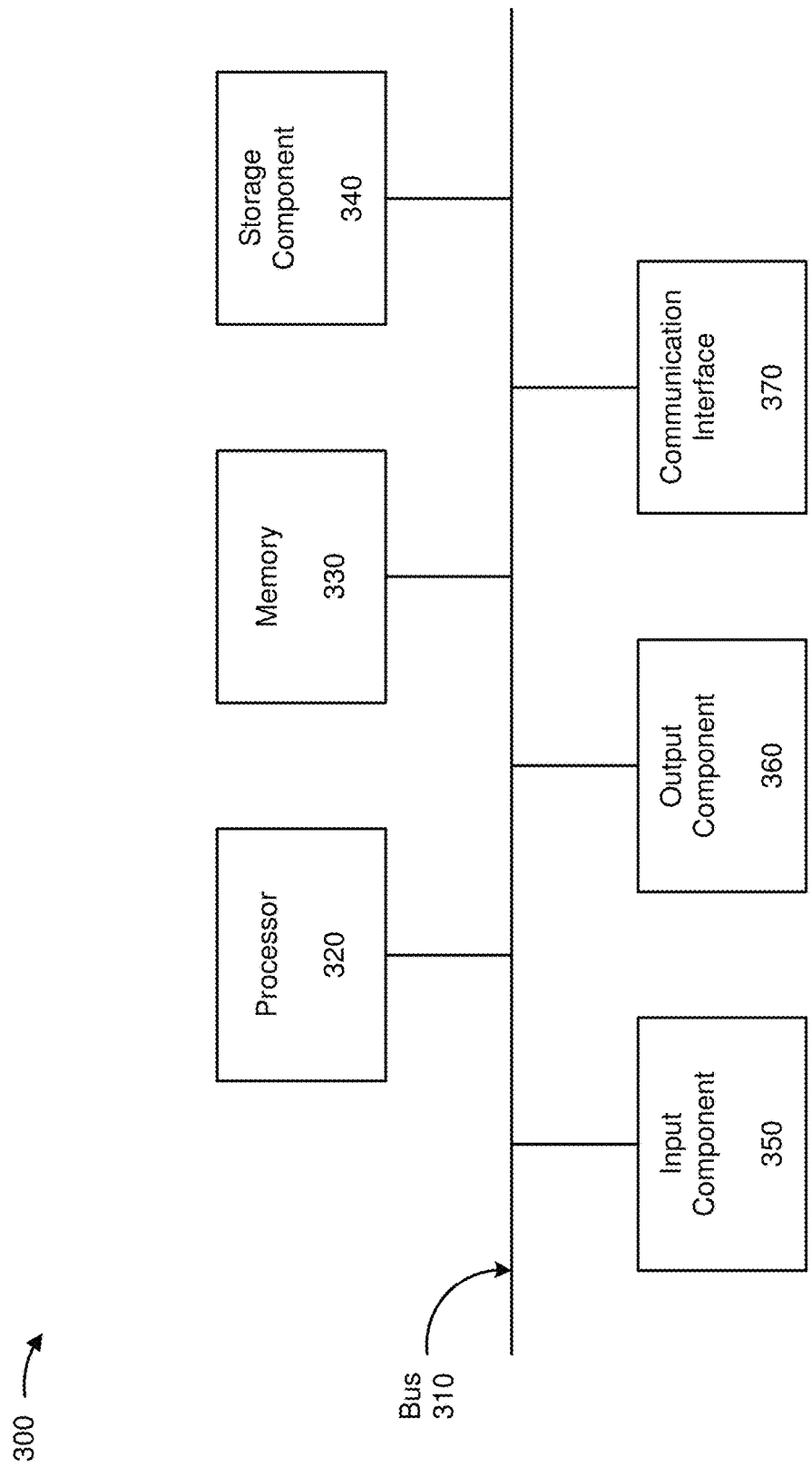
FIG. 3 is a diagram of example components of one or more devices of FIG. 2.

FIG. 3 is a diagram of example components of a device 300. Device 300 may correspond to IoT device 205, base station 210, MME/AMF 215, PGW/SGW/UPF 220, SCEF/NEF 225, HSS/AAA 230, client device 240, IoT control device 245, and/or AF 250. In some implementations, IoT device 205, base station 210, MME/AMF 215, PGW/SGW/UPF 220, SCEF/NEF 225, HSS/AAA 230, client device 240, IoT control device 245, and/or AF 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for controlling traffic in a mobile network. In some implementations, one or more process blocks of FIG. 4 may be performed by an IoT device (e.g., IoT device 205). In some implementations, one or more process blocks of FIG. 4 may be performed in conjunction with another device or a group of devices separate from or including the IoT device, such as a base station (e.g., base station 210), an MME/AMF (e.g., MME/AMF 215), a PGW/SGW/UPF (e.g., PGW/SGW/UPF 220), a SCEF/NEF (e.g., SCEF/NEF 225), an HSS/AAA (e.g., HSS/AAA 230), a client device (e.g., client device 240), an IoT control device (e.g., IoT control device 245), and/or an AF (e.g., AF 250).

As shown in FIG. 4, process 400 may include receiving a network configuration profile including one or more parameters relating to a scan interval and a mode priority of an IoT device indicating a priority for a first IoT network over a second IoT network (block 410). For example, the IoT device (e.g., using a processor 320, a memory 330, a storage component 340, an input component 350, a communication interface 370, and/or the like) may receive a network configuration profile including one or more parameters relating to a scan interval and a mode priority of an IoT device indicating a priority for a first IoT network over a second IoT network, as described above. In some implementations, the mode priority may include information relating to one or more networks that are compatible with the IoT device and/or an associated application of the IoT device. In some examples, two or more of the networks provided in the mode priority may be managed by a common network operator. Compatibility with a network may be determined based on a bandwidth of the network, a data transfer rate of the network, a degree of mobility offered by the network, a power consumption characteristic associated with the network, a cost associated with using the network, and/or another factor. In some examples, the mode priority may restrict the IoT device to the networks provided in the mode priority. One or more of the networks provided in the mode priority may be designated and/or adjusted by a user via the client device and transmitted to the IoT device via the IoT control device.

In some implementations, the mode priority may prioritize a network based on the IoT device and/or an associated application of the IoT device. The mode priority may designate multiple networks that are prioritized in order of compatibility. The priority may be indicative of an order by which the IoT device is to scan for network connectivity. One network may be prioritized over another based on bandwidth, data transfer rates, mobility, power consumption characteristics, associated costs, and/or other factors. One or more of the priorities provided in the mode priority may be designated and/or adjusted by a user via the client device and transmitted to the IoT device via the IoT control device.

In some implementations, the scan interval may be indicative of a duration of time that the IoT device is to wait before scanning for a network. In some examples, the network configuration profile may include a scan duration that is indicative of a duration a time that the IoT device is to scan for an available network (e.g., before initiating a power save mode of operation and/or the like). The scan duration and/or the scan interval may be configured to limit the time the IoT device spends on scanning for available networks and to conserve power. In some examples, such as if the IoT device is capable of initiating a power save mode of operation, the network configuration profile may include a parameter relating to a power save duration. The power save duration may be indicative of a duration of time that the IoT device is to remain in the power save mode once the power save mode is initiated and/or before scanning for available networks. The scan duration, the scan interval, and/or the power save duration may be fixed, variable, and/or configurable by a user via the client device, and transmitted to the IoT device via the IoT control device.

In some implementations, the network configuration profile may include one or more parameters relating to one or more exceptions to the mode priority. An exception may be provided for a device management session. A device management session may include a process that is specific to hardware, firmware, and/or software of the IoT device, and/or managed separately from an application associated with the IoT device. An exception to the mode priority may cause the IoT device to temporarily disable the mode priority for a duration of the device management session, and cause the IoT device to connect to a network specified by the device management session irrespective of the mode priority. One or more of the exceptions to the mode priority may be configured, added, and/or adjusted by a user via the client device, and transmitted to the IoT device via the IoT control device.

As further shown in FIG. 4, process 400 may include scanning for an availability of the first IoT network (block 420). For example, the IoT device (e.g., using a processor 320, a memory 330, a storage component 340, an input component 350, an output component 360, a communication interface 370, and/or the like) may scan for an availability of the first IoT network, as described above. In some implementations, the first IoT network may be a category M1 network (e.g., if the IoT device is intended for use with a mobile application with frequent data transmissions), or a category NB-IoT network (e.g., if the IoT device is intended for use with a fixed application with infrequent data transmissions). The IoT device may determine whether a network signal corresponding to the first IoT network (e.g., the optimal network) is available, and attempt to establish a network connection with the first IoT network if available. The IoT device may attempt to communicate with a network controller device (e.g., an MME/AMF and/or the like) of a RAN associated with the first IoT network.

As further shown in FIG. 4, process 400 may include scanning, based on determining that the first IoT network is unavailable, for an availability of the second IoT network (block 430). For example, the IoT device (e.g., using a processor 320, a memory 330, a storage component 340, an input component 350, an output component 360, a communication interface 370, and/or the like) may scan, based on determining that the first IoT network is unavailable, for an availability of the second IoT network, as described above. In some implementations, the IoT device may cease scanning for the first IoT network, determine whether a network signal corresponding to the second IoT network is available, and attempt to initiate a network connection with the second IoT network (e.g., via a network controller device of a RAN associated with the second IoT network). In some examples, if the first IoT network is a category M1 network, the mode priority may designate the second IoT network as a category NB-IoT network. In some examples, if the first IoT network is a category NB-IoT network, the mode priority may designate the second IoT network as a category M1 network.

As shown in FIG. 4, process 400 may include initiating, based on determining that the second IoT network is available, a network connection with the second IoT network (block 440). For example, the IoT device (e.g., using a processor 320, a memory 330, a storage component 340, an input component 350, an output component 360, a communication interface 370, and/or the like) may initiate, based on determining that the second IoT network is available, a network connection with the second IoT network, as described above. In some implementations, the IoT device may cause the network connection to be established via a network controller device associated with the second IoT network. For example, if the network controller device of the second IoT network is responsive, the IoT device may transmit a service request to the network controller of the second IoT network requesting registration and authentication of the IoT device to the second IoT network.

As shown in FIG. 4, process 400 may include scanning, after the scan interval and while connected to the second IoT network, for the availability of the first IoT network (block 450). For example, the IoT device (e.g., using a processor 320, a memory 330, a storage component 340, an input component 350, an output component 360, a communication interface 370, and/or the like) may scan, after the scan interval and while connected to the second IoT network, for the availability of the first IoT network, as described above. In some implementations, the IoT device may wait for a scan interval while connected to the second IoT network before scanning for the first IoT network. The IoT device may initiate a scan interval timer that is limited to the scan interval, and begin scanning for the first IoT network upon expiration of the scan interval timer.

In some implementations, such as if the first IoT network is unavailable, the IoT device may cease scanning for the first IoT network, remain connected to the second IoT network, and wait for another scan interval before scanning for the first IoT network again. The IoT device may repeat this scan cycle (e.g., continue scanning according to the scan interval) for as long as the second IoT network remains available and as long as the first IoT network remains unavailable. In some examples, the network configuration profile may include a scan cycle count limit that limits a number of scan cycles the IoT device may perform while connected to the second IoT network and/or another network. In some examples, the scan interval used by the IoT device to scan for the first IoT network while connected to the second IoT network may remain consistent (e.g., having same durations of time) for subsequent scan cycles. In some examples, a scan interval used for a subsequent scan cycle may be for a shorter duration or a longer duration than a scan interval used for a prior scan cycle. For example, subsequent scan cycles may have gradually shorter scan intervals or gradually longer scan intervals.

As further shown in FIG. 4, process 400 may include initiating, based on determining that the first IoT network is available, a network connection with the first IoT network (block 460). For example, the IoT device (e.g., using a processor 320, a memory 330, a storage component 340, an input component 350, an output component 360, a communication interface 370, and/or the like) may initiate, based on determining that the first IoT network is available, a network connection with the first IoT network, as described above. In some implementations, the IoT device may cause the network controller device associated with the first IoT network to establish the network connection. For example, if the network controller device of the first IoT network is responsive, the IoT device may transmit a service request to the network controller of the first IoT network requesting registration and authentication of the IoT device to the first IoT network. The IoT device may establish the network connection with the first IoT network before disconnecting with the second IoT network (e.g., via a make-before-break switching technique), or disconnect with the second IoT network before establishing the network connection with the first IoT network (e.g., via a break-before-make switching technique). In some examples, the IoT device may dynamically select the switching technique to apply based on a parameter of the network configuration profile, an attribute of the networks being switched, an attribute of an application associated with the IoT device, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like, depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by an Internet of Things (IoT) device and from an IoT control device, a network configuration profile,
      wherein the network configuration profile includes one or more parameters relating to a mode priority and a scan interval of the IoT device, and
      wherein the mode priority indicates a priority for a first IoT network over a second IoT network;
   scanning, by the IoT device, for an availability of the first IoT network;
   scanning, by the IoT device and based on determining that the first IoT network is unavailable, for an availability of the second IoT network;
   initiating, by the IoT device and based on determining that the second IoT network is available, a network connection with the second IoT network;
   scanning, by the IoT device, while the IoT device is connected to the second IoT network, and after the scan interval, for the availability of the first IoT network; and
   initiating, by the IoT device and based on determining that the first IoT network is available, a network connection with the first IoT network.

2. The method of claim 1, wherein the first IoT network and the second IoT network correspond to a common network operator.

3. The method of claim 1, wherein the network configuration profile includes one or more parameters relating to a power save duration and a scan duration of the IoT device,
   wherein the power save duration corresponds to a duration of a power save mode of operation,
   wherein the scan duration corresponds to a duration for scanning for the availability of the first IoT network and the availability of the second IoT network, and
   wherein the power save mode of operation is initiated based on determining that the first IoT network is unavailable and the second IoT network is unavailable for the scan duration.

4. The method of claim 1, wherein the network configuration profile includes one or more parameters relating to an exception to the mode priority of the IoT device,
   wherein the exception corresponds to a device management session, and
   wherein the device management session disables the mode priority, and maintains the one of the network connection with the first IoT network or the network connection with the second IoT network for a duration of the device management session.

5. The method of claim 1, wherein the mode priority indicates a priority for one or more of a Long-Term Evolution (LTE) category M1 network, a 5G category M1 network, an LTE category Narrow Band-Internet of Things (NB-IoT) network, a 5G category NB-IoT network, a 3G network, or a 2G Global System for Mobile Communications (GSM) network.

6. The method of claim 1, further comprising:
   scanning, based on determining that the first IoT network is unavailable, for the availability of the second IoT network;
   initiating, based on determining that the second IoT network is unavailable, a power save mode of operation for a power save duration,
      wherein the network configuration profile includes one or more parameters relating to the power save duration of the IoT device; and
   scanning, after the power save duration, for the availability of the first IoT network and the availability of the second IoT network.

7. The method of claim 1, further comprising:
   detecting initiation of a device management session,
      wherein the network configuration profile includes one or more parameters relating to an exception to the mode priority for the device management session;
   disabling, based on determining that the device management session was initiated, the mode priority; and
   maintaining one of the network connection with the first IoT network or the network connection with the second IoT network for a duration of the device management session.

8. An IoT device, comprising:
   one or more memories; and
   one or more processors, communicatively coupled to the one or more memories, to:
      receive a network configuration profile,
         wherein the network configuration profile includes one or more parameters relating to a mode priority and a scan interval of the IoT device, and wherein the mode priority indicates a priority for a first IoT network over a second IoT network;
cause a first network connection to be established with the first IoT network;
detect a loss of the first network connection with the first IoT network;
scan, based on detecting the loss of the first network connection with the first IoT network, for an availability of the first IoT network;
scan, based on determining that the first IoT network is unavailable, for an availability of the second IoT network;
cause, based on determining that the second IoT network is available, a second network connection to be established with the second IoT network;
scan, after the scan interval and while the IoT device is connected to the second IoT network, for the availability of the first IoT network; and
cause, based on determining that the first IoT network is available, the first network connection to be established with the first IoT network.

9. The IoT device of claim 8, wherein the network configuration profile includes one or more parameters relating to a power save duration and a scan duration of the IoT device,
wherein the power save duration corresponds to a duration of a power save mode of operation,
wherein the scan duration corresponds to a duration for scanning for the availability of the first IoT network and the availability of the second IoT network, and
wherein the power save mode of operation is initiated based on determining that the first IoT network is unavailable and the second IoT network is unavailable for the scan duration.

10. The IoT device of claim 8, wherein the one or more processors, when receiving the network configuration profile, are to:
receive the network configuration profile from an IoT control device,
wherein one or more of the mode priority or the scan interval are configurable via a client device in communication with the IoT control device, and
wherein the first IoT network and the second IoT network correspond to a common network operator.

11. The IoT device of claim 8, wherein the one or more processors, when scanning for the availability of the second IoT network, are to:
scan for the availability of the second IoT network; and
scan, based on determining that the second IoT network is unavailable, for the availability of the first IoT network and the availability of the second IoT network.

12. The IoT device of claim 8, wherein the one or more processors are further to:
scan, based on determining that the first IoT network is unavailable and the second IoT network is unavailable, for an availability of a third IoT network,
wherein the mode priority indicates a priority for one of the first IoT network or the second IoT network over the third IoT network;
cause, based on determining that the third IoT network is available, a third network connection to be established with the third IoT network;
scan, after the scan interval and while the IoT device is connected to the third IoT network, for one or more of the availability of the first IoT network or the availability of the second IoT network; and cause, based on determining that one or more of the first IoT network or the second IoT network is available, one of the first network connection or the second network connection to be established.

13. The IoT device of claim 8, wherein the one or more processors are further to:
scan, based on determining that the first IoT network is unavailable, for the availability of the second IoT network; and
initiate, based on determining that the first IoT network is unavailable and the second IoT network is unavailable for a scan duration, a power save mode of operation for a power save duration,
wherein the network configuration profile includes one or more parameters relating to the power save duration of the IoT device, and
wherein the scan duration corresponds to a duration for scanning for the availability of the first IoT network and the availability of the second IoT network.

14. The IoT device of claim 8, wherein the one or more processors are further to:
detect initiation of a device management session,
wherein the network configuration profile includes one or more parameters relating to an exception to the mode priority for the device management session;
disable, based on determining that the device management session was initiated, the mode priority; and
maintain one of the first network connection or the second network connection for a duration of the device management session.

15. A non-transitory computer-readable medium storing instructions, the instructions comprising:
one or more instructions that, when executed by one or more processors, cause the one or more processors to:
receive a network configuration profile of an Internet of Things (IoT) device,
wherein the network configuration profile includes one or more parameters relating to a mode priority and a scan interval of the IoT device, and
wherein the mode priority indicates a priority for a first IoT network over a second IoT network and a third IoT network, and a priority for the second IoT network over the third IoT network;
scan for an availability of the first IoT network;
scan, based on determining that the first IoT network is unavailable, for an availability of the second IoT network;
scan, based on determining that the second IoT network is unavailable, for the availability of the first IoT network and the availability of the second IoT network;
scan, based on determining that the first IoT network is unavailable and the second IoT network is unavailable, for an availability of the third IoT network;
cause, based on determining that the third IoT network is available, a network connection to be established with the third IoT network;
scan, after the scan interval and while the network connection with the third IoT network exists, for the availability of the first IoT network; and
cause, based on determining that the first IoT network is available, a network connection to be established with the first IoT network.

16. The non-transitory computer-readable medium of claim 15, wherein the network configuration profile includes one or more parameters relating to a power save duration and a scan duration of the IoT device, wherein the power save duration corresponds to a duration of a power save mode of operation, wherein the scan duration corresponds to a duration for scanning for the availability of the first IoT network, the availability of the second IoT network, and the availability of the third IoT network, and wherein the power save mode of operation is initiated based on determining that the first IoT network is unavailable, the second IoT network is unavailable, and the third IoT network is unavailable for the scan duration.

17. The non-transitory computer-readable medium of claim 15, wherein the mode priority indicates a priority for one or more of a Long-Term Evolution (LTE) category M1 network, a 5G category M1 network, an LTE category Narrow Band-Internet of Things (NB-IoT) network, a 5G category NB-IoT network, a 3G network, or a 2G Global System for Mobile Communications (GSM) network.

18. The non-transitory computer-readable medium of claim 15, wherein the one or more instructions, that cause the one or more processors to receive the network configuration profile, cause the one or more processors to:

receive the network configuration profile from an IoT control device, wherein one or more of the mode priority or the scan interval are configurable via a client device in communication with the IoT control device, and wherein the first IoT network and the second IoT network correspond to a common network operator.

19. The non-transitory computer-readable medium of claim 15, wherein the one or more instructions, when executed by the one or more processors, further cause the one or more processors to:

initiate, based on determining that the first IoT network is unavailable, the second IoT network is unavailable, and the third IoT network is unavailable for a scan duration, a power save mode of operation for a power save duration, wherein the network configuration profile includes one or more parameters relating to the power save duration of the IoT device;

wherein the scan duration corresponds to a duration for scanning for the availability of the first IoT network, the availability of the second IoT network, and the availability of the third IoT network, and scan, after the power save duration, for the availability of the first IoT network, the availability of the second IoT network, and the availability of the third IoT network.

20. The non-transitory computer-readable medium of claim 15, wherein the one or more instructions, when executed by the one or more processors, further cause the one or more processors to:

detect initiation of a device management session, wherein the network configuration profile includes one or more parameters relating to an exception to the mode priority for the device management session;

disable, based on determining that the device management session was initiated, the mode priority; and maintain one of a network connection with the first IoT network, a network connection with the second IoT network, or the network connection with the third IoT network for a duration of the device management session.

\* \* \* \* \*